United States Patent
Murdoch et al.

(10) Patent No.: US 6,395,065 B1
(45) Date of Patent: May 28, 2002

(54) AIR FLOW CONTROL IN A GAS FRACTIONALIZATION SYSTEM AND ASSOCIATED METHOD

(75) Inventors: Robert W. Murdoch, Woodstock, GA (US); Valery Kravets, Holland; Scott Banks, Ivyland, both of PA (US)

(73) Assignee: Respironics, Inc., Pittsburgh, PA (US)

( * ) Notice: Subject to any disclaimer, the term of this patent is extended or adjusted under 35 U.S.C. 154(b) by 0 days.

(21) Appl. No.: 09/567,244

(22) Filed: May 11, 2000

Related U.S. Application Data
(60) Provisional application No. 60/134,364, filed on May 14, 1999.

(51) Int. Cl.[7] ............................................. B01D 53/053
(52) U.S. Cl. ............................... 95/22; 95/130; 96/113; 96/130
(58) Field of Search ........................... 95/12, 19, 22, 95/23, 130; 96/113, 114, 130

(56) References Cited

U.S. PATENT DOCUMENTS

| | | | | |
|---|---|---|---|---|
| 4,561,287 A | * | 12/1985 | Rowland ......................... | 73/23 |
| 4,584,001 A | * | 4/1986 | Dechene ......................... | 96/114 |
| 4,717,396 A | * | 1/1988 | Stengle et al. ................... | 95/22 |
| 4,806,132 A | * | 2/1989 | Campbell ......................... | 95/12 |
| 4,846,850 A | * | 7/1989 | Webb .............................. | 95/19 |
| 4,857,082 A | * | 8/1989 | DiMartino, Sr. et al. ........ | 95/19 |
| 4,995,889 A | * | 2/1991 | Abel et al. ....................... | 95/22 |
| 5,183,483 A | * | 2/1993 | Servido et al. .................. | 55/26 |
| 5,258,056 A | * | 11/1993 | Shirley et al. ................... | 95/22 |
| 5,474,595 A | * | 12/1995 | McCombs ....................... | 95/23 |
| 5,496,388 A | * | 3/1996 | Tellier ............................. | 96/113 X |
| 5,593,478 A | * | 1/1997 | Hill et al. ........................ | 96/130 X |
| 5,746,806 A | * | 5/1998 | Aylsworth et al. ............. | 95/12 X |
| 5,876,485 A | * | 3/1999 | Andreani ......................... | 95/23 |
| 5,893,944 A | * | 4/1999 | Dong ............................... | 96/114 |
| 5,906,672 A | * | 5/1999 | Michaels et al. ................ | 95/12 |
| 5,917,135 A | * | 6/1999 | Michaels et al. ................ | 95/12 X |
| 6,063,169 A | * | 5/2000 | Cramer et al. ................... | 96/114 X |
| 6,077,331 A | * | 6/2000 | Phillips .......................... | 95/12 |

FOREIGN PATENT DOCUMENTS

| | | | | |
|---|---|---|---|---|
| JP | 57-071804 | * | 5/1982 | ..................... 95/12 |
| JP | 64-007001 | * | 2/1989 | ..................... 95/12 |
| JP | 01-210012 | * | 8/1989 | ..................... 95/19 |

* cited by examiner

*Primary Examiner*—Robert H. Spitzer
(74) *Attorney, Agent, or Firm*—Michael W. Haas

(57) ABSTRACT

A system and method for improving the efficiency of a gas fractionalization system of the type having a compressor having an inlet for receiving air from the ambient environment. The system includes a sensor for sensing a parameter indicative of the flow of concentrated gas delivered from the gas fractionalization system to a patient. A multi-positional valve is disposed in line with the compressor for regulating the flow of air from the ambient environment into the compressor. A valve control manipulates the position of the multi-positional valve depending on the value of the parameter sensed by the sensor for regulating the quantity of air received from the ambient environment into the compressor inlet.

9 Claims, 1 Drawing Sheet

AIR FLOW CONTROL IN A GAS FRACTIONALIZATION SYSTEM AND ASSOCIATED METHOD

CROSS-REFERENCE TO RELATED APPLICATIONS

This application claims priority under 35 U.S.C. § 119(e) from U.S. provisional patent application No. 60/134,364, filed May 14, 1999.

BACKGROUND OF THE INVENTION

1. Field of the Invention

This invention pertains to an apparatus and method for separating gas components by a gas fractionalization system, and, more particularly, to the regulation of the work done by a compressor by manipulating the air flow through the compressor depending on the quantity of consumable gas requested by an end user.

2. Description of the Related Art

Gas fractionalization systems are used for separating a desired gas from a gas mixture, such as air, and delivering the separated gas to an end user. A typical gas fractionalization system is an oxygen concentrator, which separates the oxygen from air, for subsequent inhalation by a patient. An oxygen concentrator, or similar pressure swing absorption system, typically includes molecular sieve beds for separating the gas into an oxygen and a nitrogen fraction. The oxygen is subsequently provided to the patient while the nitrogen is retained in the sieve bed and subsequently purged. Generally, in a pressure swing absorption system, two sieve beds are utilized. One sieve bed separates nitrogen from the oxygen while the other sieve bed is simultaneously being purged of the nitrogen previously absorbed during the prior fractionalization cycle.

Typically, an oxygen concentrator utilizes a compressor that draws air from the ambient environment and presents compressed air to the molecular sieves pressurizing the sieves for fractionalization of the gases. The concentrated gas then enters a product chamber. A flow metering device is located between the product chamber and the patient. The user manipulates the flow metering device to present a desired amount of oxygen to the patient. Typically, an oxygen concentrator can provide a flow of oxygen ranging from 1 liter per minute to 5 liters per minute. The amount of oxygen delivered to a patient is prescribed by a physician and may vary depending on the physical condition of the patient. A typical oxygen concentrator is illustrated in U.S. Pat. No. 5,183,483 the contents of which are incorporated herein by reference.

Even though oxygen concentrators are designed to provide an oxygen flow rate between 1 to 5 liters per minute, these concentrators usually operate at less than full capacity and typically are operated to provide only 2 liters of oxygen per minute, as generally prescribed. While these oxygen concentrators may provide various flow outputs of oxygen, such systems are generally not designed to provide a varying input flow of air into the molecular sieves. Accordingly, the compressors of these systems continuously operate at one level which produces the maximum flow of oxygen. This results in the compressor needlessly working harder than required to produce the desired flow of oxygen if the flow selected by the patient is less than the maximum output of the gas fractionalization system. The drawbacks of the compressor working harder than necessary are that the compressor at full capacity is noisier than required and also utilizes more power than required. Furthermore, the compressor operates at a higher temperature, increasing the wear of the compressor components. Thus, it is desirable to reduce the work of the compressor when the desired flow rate of the oxygen concentrator is less than the maximum flow rate.

U.S. Pat. No. 5,474,595 discloses an oxygen concentrator system utilizing a compressor having a manually operated valve for reducing air flow into the compressor when the flow output of the oxygen concentrator is less than the maximum output. This patent discloses a two position valve enabling air flow at either a high capacity rate or a low capacity rate depending on the usage by the patient. This valve is manually operated and requires the attendance of a technician to set the valve to the proper position depending on the usage of the concentrator.

U.S. Pat. No. 4,561,287 discloses an oxygen concentrator system that automatically controls the timing cycle for charging the molecular sieve beds by monitoring the pressure levels within the product chamber to determine patient utilization. While this system is suitable for its intended purpose, it functions by manipulating a valve downstream of the compressor for charging the molecular sieve beds and, therefore, does not directly reduce the air mass flow through the compressor.

SUMMARY OF THE INVENTION

Accordingly, it is an object of the present invention to provide a pressure swing absorption system wherein the operation of the compressor is modified to correlate the air mass flow through the compressor automatically to correspond with the desired output of the product gas, which results in a reduction in the work done by the compressor.

Furthermore, it is an object of the present invention to provide a gas fractionalization system wherein control of the gas into the compressor is performed based on a parameter indicative of the flow rate of the product gas, thereby requiring less power and providing a more tranquil operating environment.

These objects are accomplished according to the principles of the invention by providing a gas fractional system and method for gas fractionalization having improved efficiency. The gas fractionalization system includes a compressor having an inlet for receiving air from the ambient environment. The system also includes a sensor for sensing a parameter indicative of the flow of concentrated gas delivered from the gas fractionalization system to a patient. A multi-positional valve is disposed in line with the compressor for regulating the flow of air from the ambient environment into the compressor. A valve control manipulates the position of the multi-positional valve depending on the value of the parameter sensed by the sensor for regulating the quantity of air received from the ambient environment into the compressor inlet.

A method for controlling airflow in a gas fractionalization system that achieves the above objects includes the steps of 1) providing a multi-positional valve inline with an inlet of a compressor to control a flow of air from an ambient atmosphere into the inlet, 2) producing concentrated gas from pressurized gas generated by the compressor and delivering a flow of the concentrated gas to a patient, 3) monitoring a parameter indicative of an amount of concentrated gas delivered to such a patient, and 4) controlling the multi-positional valve based on the parameter indicative of the flow of concentrated gas delivered to such a patient so as to regulate the flow of air from an ambient atmosphere into the inlet of the compressor based on the parameter.

These and other objects, features and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

The FIGURE is a schematic view of a pressure swing absorption system having a control system for regulating a multi-positional valve depending on the usage of product gas by the patient according to the principles of the present invention.

DETAILED DESCRIPTION OF THE PRESENTLY PREFERRED EMBODIMENTS OF THE INVENTION

Figure 1:
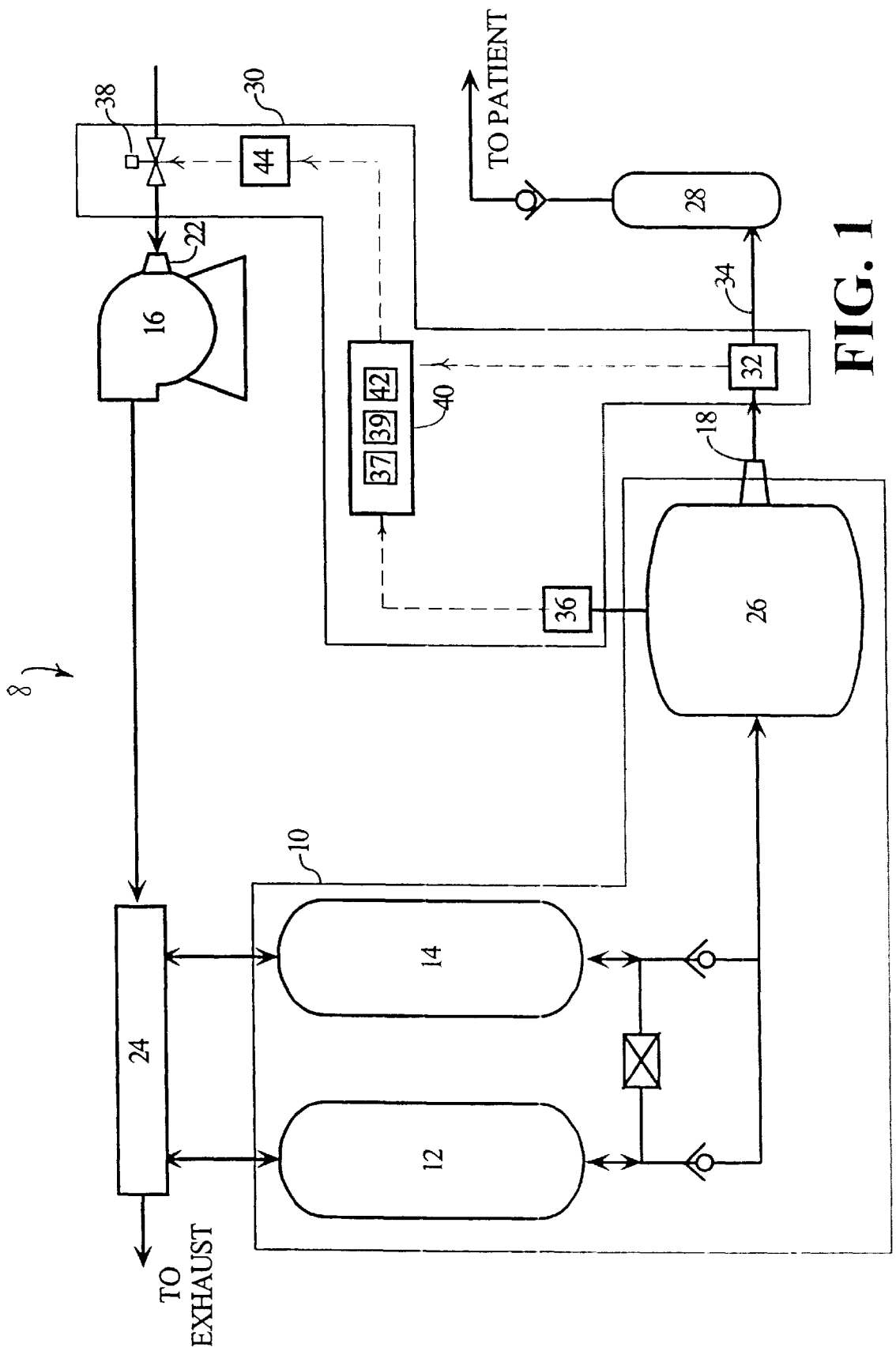

The functioning of gas fractionalization systems are well known and a fully detailed description of such can be found in U.S. Pat. No. 5,183,483, entitled "Pneumatic Circuit Control for Pressure Swing Adsorption Systems" the contents of which are incorporated herein by reference. For clarification purposes, only a general description of a gas fractionalization system will be discussed. As shown in the FIGURE, gas fractionalization system 8 includes molecular sieve housing 10, which houses a pair of molecular sieves 12 and 14 and a product chamber 26, a compressor 16 for introducing pressurized air to the molecular sieves, and a gas outlet 18 enabling concentrated gas to exit product chamber 26 for presentation to an end user. Gas fractionalization system 8 is preferably an oxygen concentrator that utilizes molecular sieves 12 and 14 to fractionate air drawn from the ambient environment by compressor 16 to produce concentrated oxygen, which is delivered to a patient at a determinable flow rate.

Compressor 16 includes a compressor inlet 22 through which air is drawn and subsequently presented through respective valving and conduits to a valve system 24. Valve system 24 regulates the passage of pressurized air to the molecular sieves. As is typical with a pressure swing adsorption system, valve system 24 cycles between presenting pressurized air to a first molecular sieve 12 for producing concentrated oxygen while enabling the purging of waste by-product gas from a second molecular sieve 14 that was produced from a previous operation of producing concentrated oxygen and, thereafter, presenting pressurized air to second molecular sieve 14 for producing concentrated oxygen while enabling the purging of waste by-product gas from first molecular sieve 12. The oxygen product is subsequently transferred from a charging molecular sieve to product chamber 26 for subsequent inhalation by a patient. A variable flow valve 28 is manipulated by a patient to control the amount of oxygen product delivered to the patient. The variable flow valve is typically designed so that a flow rate between one to five liters of oxygen product is delivered to the patient per minute. Of course other flows may be provided.

In an exemplary embodiment of the present invention, a valve control system 30 controls the positioning of a multi-positional valve 38 depending on the value of the parameter that corresponds to the oxygen flow rate delivered to the patient. Valve control system 30 includes a sensor 32 that senses a parameter indicative of the flow of concentrated gas drawn from the product chamber by an end user. Valve control system 30 further includes a multi-positional valve 38 that regulates the flow of air from the ambient environment through compressor inlet 22. An example of a suitable multi-positional valve 38 is the proportional valve manufactured by Technocraft, Inc. of Melbourne, Fla. A proportional valve functions according to the current supplied to the valve.

Valve control system 30 also includes a microcomputer 40. Microcomputer 40 is a standard microcomputer that includes various components including, but not limited to a memory 37 and a processor 39. Microcomputer 40 controls the regulation of current flow to multi-positional valve 38 depending on the value of the parameter that corresponds to the oxygen flow rate delivered to the patient. Multi-positional valve 38 is manipulated in order to regulate the airflow into the compressor only to the extent necessary to produce the quantity of concentrated oxygen that is sensed being demanded by the patient.

Sensor 32 may be comprised of several different types of sensors. For instance, sensor 32 may be a flow meter that measures the flow rate of oxygen delivered to the patient through an outlet line 34. Alternatively, sensor 32 may be a microprocessor that is set to the level of oxygen flow prescribed by a doctor. However, to reduce costs, sensor 32 is preferably a pressure sensor 36, which senses the pressure changes within product chamber 26. By monitoring the pressure changes within the product chamber, a parameter which correlates to the flow rate of oxygen being utilized by the patient may be determined. The parameter correlating to the oxygen flow rate may be based directly on the fluctuation of the pressure within the molecular sieves or it may be based on some derivative of the pressure change within the respective molecular sieves.

In an exemplary embodiment, the present invention contemplates calculating the ratio between the high pressure level and the low pressure level that occur within the product chamber during one operating cycle, a portion of an operating cycle, or that occur in the product chamber over a plurality of operating cycles and using this ratio as a parameter that correlates to the oxygen flow rate delivered to the patient. For present purposes, one operating cycle of a pressure swing absorption system includes four phases. Phase one consists of the pressurization of first molecular sieve 12 and the simultaneous purging of second molecular sieve 14. Phase two is a pressure equalization phase wherein the pressure is equalized between both molecular sieves. Phase three consists of the pressurization of second molecular sieve 14 and the simultaneous purging of first molecular sieve 12. Phase four is another pressure equalization phase where the pressure is equalized between both molecular sieves. The time period required to pressurize a respective sieve is referred to as the pressurization time. The complete time to accomplish all four phases is known as the valve cycle time.

In a preferred exemplary embodiment of the present invention, the ratio between the high pressure levels and the low pressure levels within the product chamber during half of the operating cycle is used as a parameter that correlates to the oxygen flow rate delivered to the patient. A half operating cycle includes the pressurization of one of the molecular sieves, as well as the purging of the other sieve, (phase one or three), and the balancing of the pressure between the two sieves (phase two or four). The present invention contemplates, however, that the pressure variations that take place during the pressurization phase alone (phase one or phase three) can be used to determine the ratio between the high pressure level and the low pressure level within the product chamber, which is then used as a parameter that correlates to the oxygen flow rate delivered to the patient.

Tests conducted by the present inventors establish that a correlation exists between the ratio of the high pressure level and the low pressure level in the product chamber during one of the above intervals, such as the half or complete operating cycle, and the actual flow of oxygen demanded by the patient. For example, when the patient demands 1.6 liters per minute, the ratio of the high pressure level versus the low pressure level in the product chamber over a half operating cycle is approximately 1.175, while the ratio between the high pressure level with the low pressure level is between 1.18 and 1.260 when the patient withdraws between 1.6 and 2.6 liters per minute. Furthermore, the ratio of the high pressure level versus the low pressure level is between 1.265 and 1.320 when the patient demands between 2.6 and 3.6 liters per minute. Additionally, the ratio of the high pressure level versus the lower pressure level is equal to or greater than 1.325 when the patient demands more than 3.6 liters per minute.

The multi-positional valve is manipulated in order to regulate the airflow into the compressor only to the extent necessary to produce the quantity of concentrated oxygen being demanded by the patient. To accomplish this in the preferred embodiment, the parameter indicative of the flow of concentrated gas drawn from the product chamber by an end user is transmitted from sensor 32 to microcomputer 40. Microcomputer 40 also includes lookup table 42 stored in memory 37, which includes data for manipulating multi-positional valve 38 such that only the airflow required to produce the desired oxygen flow rate at a sufficient concentration level is allowed to pass through multi-positional valve 38 into compressor inlet 22. Lookup table 42 utilizes the sensed flow as an input and produces as an output the respective multi-positional valve position to produce that respective flow. A scaler utilizes the look up table output to deliver the correct amount of current to multi-positional valve 38 to position the valve such that the desired airflow is allowed to enter compressor inlet 22. Microcomputer 40 sends the respective multi-positional valve control signal depending on the required position of multi-positional valve 38 to a digital/analog converter 44, which sends the required electrical signal to multi-positional valve 38 for manipulating the position of multi-positional valve 38.

For example, the present contemplates that the lookup table is the following:

| Ratio | Valve Position |
|---|---|
| 1.320 or above | Fully open |
| 1.260–1.320 | ¾ open |
| 1.175–1.260 | ½ open |
| 1.260 or less | ¾ closed |

Of course, it would be obvious to one skilled in the art that a look up table may include a significant number of data points for controlling the position of multi-positional valve 38.

By monitoring the demand flow of oxygen requested by a patient, the volume of air flowing into the molecular sieves may be controlled such that only the amount of air necessary to produce the desired oxygen flow to the patient is provided through compressor inlet 22.

Accordingly, in operation, multi-positional valve 38 is initially positioned so that compressor inlet 22 is unrestricted, thereby permitting the maximum amount of air flow from the ambient environment to be compressed by the compressor for initially charging the molecular sieves. Subsequently, during operation of the gas fractionalization system, the amount of product gas demanded by the patient is measured by the control system and relayed to the microcomputer as a parameter correlating to the oxygen flow rate delivered to the patient. The microcomputer utilizes the parameter as an input and continuously updates the position of the multi-positional valve by varying the current supplied to the multi-positional valve. The valve manipulates the amount of air flow from the ambient environment into the compressor depending on the amount of flow to be presented to the molecular sieves for producing the amount of product gas at a desirable concentration level which is delivered to the patient.

Tests previously conducted illustrated that when the maximum amount of air is presented to provide the maximum product flow, the compressor typically requires approximately three hundred fifty watts of power. However, when a lower amount of air flow is presented to the compressor, the compressor requires less wattage. For example, when the compressor only receives sufficient air to provide three liters per minute of product gas, the compressor utilizes only two hundred seventy-five watts.

Thus an advantageous design for an oxygen concentrator may be had according to the present invention by monitoring the delivery of concentrated gas to a patient and varying the amount of air drawn into a compressor by varying the size of the compressor inlet accordingly. By reducing the size of the compressor inlet, the mass airflow is thus reduced resulting in reducing the work of the compressor which reduces the operating temperature of the compressor which increases the compressor's operating life.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. A method for controlling airflow in a gas fractionalization system comprising:
    providing a multi-positional valve inline with an inlet of a compressor to control a flow of air from an ambient atmosphere into the inlet;
    producing concentrated gas from pressurized gas generated by the compressor;
    accumulating the concentrated gas to a product chamber for subsequent delivery to a patient;
    monitoring a pressure within the product chamber; and
    controlling the multi-positional valve based on the pressure within the product chamber so as to regulate the flow of air from an ambient atmosphere into the inlet of the compressor.

2. The method of claim 1, wherein the monitoring step includes monitoring a high pressure level and a low pressure level within the product chamber, wherein the controlling step includes determining a ratio between the high and low pressure levels and controlling the multi-positional valve based on the ratio.

3. A gas fractionalization system comprising:

a compressor having an inlet adapted to receive a flow of air from an ambient environment;

a molecular sieve assembly operatively coupled to the compressor, wherein the molecular sieve assembly separates such air into components including a concentrated gas, the molecular sieve assembly having an outlet;

a product chamber operatively coupled to the outlet of the molecular sieve assembly so as to receive the concentrated gas from the molecular sieve; and a control system associated with the compressor, the control system comprising:

a sensor operatively coupled to the product chamber so as to monitor pressure levels within the product chamber;

a multi-positional valve operatively coupled to the compressor inlet to regulate the flow of air to the compressor; and a valve controller operatively coupled to the sensor and the multi-positional valve, wherein the valve controller automatically controls a position of the multi-positional valve based on the monitored pressure in the product chamber so as to regulate a quantity of air into the inlelt of the compressor.

4. The system of claim 3, wherein the valve controller determines a ratio between a high pressure and a low pressure within the product chamber detected by the sensor and controls the position of the multi-positional valve based on the ratio.

5. The system of claim 3, wherein the molecular sieve assembly includes a plurality of individual molecular sieve beds.

6. A gas fractionalization system comprising:

compressor means, receiving a flow of air from an ambient environment, for producing a pressurized flow of such air;

valve means, disposed at an inlet of the compressor means, for controlling the flow of air from the ambient environment into the compressor means;

sieve means for producing concentrated gas from the pressurized flow of air generated by the compressor means;

tank means for receiving the concentrated gas from the sieve means;

means for delivering a flow of the concentrated gas from the tank means to a patient;

sensor means for monitoring a pressure level within the tank means; and valve control means for controlling the valve means based on the pressure level within the tank means so as to regulate the flow of air from an ambient atmosphere into the inlet of the compressor means.

7. The system of claim 6, wherein the sensor means monitors a high pressure level and a low pressure level within the tank means, and wherein the valve control means determines a ratio between the high pressure level and the low pressure level and controls the flow of air from ambient atmosphere into the inlet of the compressor means based on the ratio.

8. The system of claim 6, wherein the sieve means includes a plurality of individual molecular sieve beds.

9. The system of claim 6, wherein the valve means is a multi-positional valve disposed inline with the inlet of the compressor means to regulate the flow of air from the ambient environment to the compressor means, the multi-positional valve being actuated by the valve control means to control a position of the multi-positional valve based on the pressure level within the tank means to regulate a quantity of air delivered from ambient environment into the compressor means.

* * * * *